US006436178B1

(12) United States Patent
Hosmer

(10) Patent No.: US 6,436,178 B1
(45) Date of Patent: Aug. 20, 2002

(54) INKJET INK AND OTHER INK COMPOSITIONS CONTAINING CYCLIC AMIDES

(75) Inventor: Jason D. Hosmer, Arlington, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/740,915

(22) Filed: Dec. 20, 2000

Related U.S. Application Data
(60) Provisional application No. 60/172,834, filed on Dec. 20, 1999.

(51) Int. Cl.[7] ............................................. C09D 11/02
(52) U.S. Cl. ............................ 106/31.46; 106/31.47; 106/31.49; 106/31.76; 106/31.77; 106/31.78
(58) Field of Search ...................... 106/31.46, 31.47, 106/31.49, 31.76, 31.77, 31.78

(56) References Cited

U.S. PATENT DOCUMENTS

| | | | | |
|---|---|---|---|---|
| 2,833,736 A | | 5/1958 | Glaser ........................ 524/557 |
| 3,607,813 A | | 9/1971 | Purcell ......................... 524/88 |
| 4,770,706 A | | 9/1988 | Pietsch ..................... 106/31.83 |
| 5,026,755 A | | 6/1991 | Kveglis et al. .............. 524/389 |
| 5,093,031 A | | 3/1992 | Login et al. ................ 252/357 |
| 5,294,644 A | | 3/1994 | Login et al. ................ 514/698 |
| 5,302,197 A | | 4/1994 | Wickramanayke et al. ........................ 106/31.47 |
| 5,489,671 A | * | 2/1996 | Ogino et al. .............. 106/31.48 |
| 5,493,971 A | | 2/1996 | Lewis et al. ................ 101/454 |
| 5,530,105 A | * | 6/1996 | Yamazaki et al. ........ 106/31.52 |
| 5,571,311 A | | 11/1996 | Belmont et al. ............ 106/31.6 |
| 5,609,671 A | | 3/1997 | Nagasawa ................... 106/31.9 |
| 5,630,868 A | | 5/1997 | Belmont et al. ........... 106/31.75 |
| 5,707,432 A | | 1/1998 | Adams et al. .............. 106/31.6 |
| 5,713,988 A | | 2/1998 | Belmont et al. ............ 106/31.6 |
| 5,725,641 A | * | 3/1998 | MacLeod .................... 106/31.5 |
| 5,803,959 A | | 9/1998 | Johnson et al. .......... 106/31.75 |
| 5,837,045 A | | 11/1998 | Johnson et al. .......... 106/31.85 |
| 5,851,280 A | | 12/1998 | Belmont et al. ............ 106/472 |
| 5,858,075 A | * | 1/1999 | Deardurff et al. ........ 106/31.27 |
| 5,885,335 A | | 3/1999 | Adams et al. .............. 106/31.6 |
| 5,895,522 A | | 4/1999 | Belmont et al. ............ 106/31.6 |
| 5,900,029 A | | 5/1999 | Belmont et al. ................ 8/550 |
| 5,922,118 A | | 7/1999 | Johnson et al. ............ 106/31.6 |
| 5,955,232 A | | 9/1999 | Little et al. .................. 430/106 |
| 5,972,431 A | * | 10/1999 | Marsella et al. ............. 427/384 |
| 5,980,622 A | * | 11/1999 | Byers ....................... 106/31.48 |
| 6,231,654 B1 | * | 5/2001 | Elwakil .................... 106/31.47 |

FOREIGN PATENT DOCUMENTS

| | | | |
|---|---|---|---|
| EP | 0 604 822 A | 7/1994 | ........... C09D/11/00 |
| EP | 0 819 738 A | 1/1998 | ........... C09D/11/00 |
| EP | 834537 | 4/1998 | |
| JP | 283646 | * 10/1996 | |
| JP | 124991 | * 5/1997 | |
| JP | 10265704 | 10/1998 | |
| JP | 10265710 | 10/1998 | |
| JP | 11092686 | 4/1999 | |
| JP | 11166131 | 6/1999 | |
| WO | WO 96/18688 | 6/1996 | |
| WO | WO 98/30638 | 7/1998 | |
| WO | WO 98/32801 | 7/1998 | |

OTHER PUBLICATIONS

Patent abstracts of Japan for JP08/283646, Oct. 1996.*
Patent abstracts of Japan for JP09/124991, May 1997.*
"Compatibility Study of CAB–O–JET® 200 Black Colorant", Cabot Corporation Brochure, 1997. (6 pgs), No Month Avail.
"Cosolvent Studies with CAB–O–JET® 300 Black Colorant", Cabot Corporation Brochure, 1999. (4 pgs), No Month Avail.
International Search Report for PCT/US00/34751 mailed Jun. 7, 2001.
JP 61 285277 A to Mitsubishi Chem. Ind. Ltd.—Abstract only (from Patent Abstracts of Japan, vol. 011, No. 150 (C–422), May 15, 1987).
JP 61 023664 A to Orient Kagaku Kogyo KK—Abstract only (from Patent Abstracts of Japan, vol. 010, No. 172 (C–354), Jun. 18, 1986).

* cited by examiner

*Primary Examiner*—Helene Klemanski

(57) ABSTRACT

An ink, such as an inkjet ink composition is described which contains at least one colorant, at least one liquid vehicle, at least one humectant, and at least one cyclic amide. Methods to improve the resistance to highlighter smear, minimize banding of a printed image, improve the dry or wet rub resistance of a printed image, and/or improve the waterfastness of a printed image using the ink compositions of the present invention are further described.

21 Claims, No Drawings

INKJET INK AND OTHER INK COMPOSITIONS CONTAINING CYCLIC AMIDES

This application claims the benefit under 35 U.S.C. §119(e) of prior U.S. Provisional Patent Application No. 60/172,834 filed Dec. 20, 1999, which is incorporated in its entirety by reference herein.

BACKGROUND OF THE INVENTION

The present invention relates to ink compositions, including inkjet ink compositions, and further relates to methods to improve certain print properties, such as waterfastness, banding, dry/wet rub, and highlighter smear properties.

Inks and in particular inkjet inks have achieved many of the properties desired for inks when printed into images by printers. However, there is constantly an effort to improve on currently available inkjet inks. For instance, there is always a desire by consumers to see improved resistance to highlighter smear, further minimizing of the degree of banding, dry/wet rub resistivity and/or, improved waterfastness of the image printed by inkjet inks.

Accordingly, any improvement in one or more of these properties is always a goal by manufacturers in order to meet customer demand and satisfaction with inkjet inks.

It is also desirable to produce improved aqueous ink compositions which exhibit improved latency and recoverability in their respective printing systems while providing good print properties. A further need exists for improved colorants and ink compositions which contain the colorants.

While the above-described inks have advanced the quality of inks, there is always a need for more improved properties such as resistivity to highlighter smear, further minimizing of the degree of banding, improved dry rub/wet resistivity, and/or waterfastness improvement.

SUMMARY OF THE INVENTION

A feature of the present invention is to provide ink compositions, especially inkjet ink compositions, which have one or more of the above-described improved properties.

Another feature of the present invention is to provide ink compositions which are dispersible in liquid vehicles and yet retain one or more of the above-described properties.

Additional features and advantages of the present invention will be set forth in part in the description which follows, and in part will be apparent from the description, or may be learned by practice of the present invention. The objectives and other advantages of the present invention will be realized and obtained by means of the elements and combinations particularly pointed out in the written description and appended claims.

To achieve these and other advantages and in accordance with the purpose of the present invention, as embodied and broadly described herein, the present invention relates to an ink containing at least one colorant, at least one liquid vehicle, at least one humectant, and at least one cyclic amide.

The present invention further relates to inkjet inks having the above formulation.

The present invention further relates to methods to improve resistance to highlighter smear, minimize the degree of banding, improve dry/wet rub resistivity, and/or improve waterfastness by incorporating into the ink at least one cyclic amide in a sufficient amount to improve one or more of the above-described properties.

It is to be understood that both the foregoing general description and the following detailed description are exemplary and explanatory only and are intended to provide further explanation of the present invention, as claimed.

DETAILED DESCRIPTION OF THE PRESENT INVENTION

The present invention relates to ink compositions which contain at least one colorant, at least one liquid vehicle, at least one humectant, and at least one cyclic amide. Preferably, the inks of the present invention are inkjet inks.

The colorant can be at least one pigment, at least one dye, or mixtures thereof.

The pigment which can be present in the ink formulation can be, but is not limited to, pigments traditionally used in ink compositions (including inkjet ink compositions), and the like. Examples include, but are not limited to, black pigments (e.g., carbon products like carbon black) and other colored pigments (e.g., polymeric and organic pigments). Preferably, the pigment is a black pigment and more preferably is a carbon black. Similarly, the dye which can be present in the ink formulation can be, but is not limited to, dyes traditionally used in ink compositions.

The pigment, if one is used, can be present as a pigment dispersion. Examples of such dispersions include, but are not limited to dispersions known as Permajet, Hostafine, and Novasil dispersions from Clariant; Disperjet dispersions from BASF; Bayer Script dispersions from Bayer; IDIS dispersions from Degussa; Bonjet dispersions from Orient Chemical; and Acryjet dispersions from Rohm and Haas.

With respect to the cyclic amide, a variety of cyclic amides can be used. More than one type of cyclic amide can be used in the inks of the present invention. Preferably, the cyclic amide has the following formula:

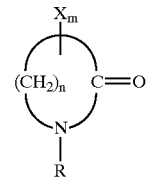

In this formula, n is an integer of from 3 to 7, m is an integer of from 0 to 3 or equals n; X represents an alkyl group; and R represents an alkyl group. Preferably, X is an alkyl group having from 1 to 4 carbons and is optionally substituted with hydroxy or ether groups. The R group is preferably an alkyl group having at least 5 carbon atoms, such as, a C5–C20 alkyl group. More preferably, R is a C5–C12 alkyl group, and most preferably is a C8–C12 alkyl group. R can be cyclic or non-cyclic, and preferably is a straight chained or branched alkyl group. R can be substituted with one or more groups, such as functional groups like methyl, ethyl, propyl, and the like.

Preferred cyclic amide groups include alkyl pyrrolidone, and more preferably n-alkyl pyrrolidone. Even more preferably, the alkyl pyrrolidone is an alkyl-2-pyrrolidone or n-alkyl-2-pyrrolidone. Specific examples include, but are not limited to, n-octyl-2-pyrrolidone and n-dodecyl-2-pyrrolidone. The cyclic amides are commercially available from such suppliers as International Specialty Products under the trade names Surfadone™. These compounds can be made and are described in U.S. Pat. No. 5,294,644 which is incorporated in its entirety by reference herein. Some of these compounds are also described in U.S. Pat. No. 5,302,197 which is incorporated in its entirety by reference herein as well.

When the cyclic amide is present in an ink composition, and preferably in an inkjet ink composition, the ink, when compared to inks not containing the cyclic amide has an improved resistance to highlighter smear when printed into an image. The ink can, when printed into an image, lead to an even print which is also known as minimizing the degree of banding. Further, the ink of the present invention, when printed into an image, can have an improved waterfast resistance and/or a better dry or wet rub property (i.e., the printed image has a better resistance to dry or wet rub).

With respect to the humectant, one or more humectants can be present and the humectant can be chosen from humectants typically used in inks and inkjet inks. In particular, a humectant may be added to reduce the rate of evaporation of water in the ink to minimize clogging. If the ink begins to dry out, the humectant concentration increases and evaporation decreases further. Humectants may also affect other properties of the ink and prints made therefrom, such as viscosity, pH, surface tension, optical density, latency, and print quality. Preferred humectants include ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, cellosolve, ether derivatives, amino alcohols, and ketones. The humectant can be present in conventional amounts. Preferably, the humectant is present in amount of from about 10% to about 25% based on the weight of the ink composition.

Common additives such as those discussed below may be added to the dispersion to further improve the properties of the inkjet ink. Suitable additives are also generally incorporated into the ink or inkjet composition to impart a number of desired properties while maintaining the stability of the compositions. For example, a surfactant or suitable polymer may be used to further enhance the colloidal stability of the pigment, if present, in the ink composition. Other additives are well known in the art and include biocides, binders, drying accelerators, penetrants and the like. The amount of a particular additive will vary depending on a variety of factors but are generally present in an amount ranging between 0% and 40%, preferably between 0. 1% and 10%, although the amount may be outside this range.

Biocides such as benzoate or sorbate salts are important in preventing bacterial growth. Bacteria are often larger than ink nozzles and can cause clogging and other problems. Binders attach to the substrate to hold the colorant on the paper. Examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof. Drying accelerating agents promote evaporation of the ink once the ink is placed in the paper. These include sodium lauryl sulfate, N,N-diethyl-m-toluamide, cyclohexylpyrrolidinone, and butyl carbitol. Penetrants such as alcohols, sodium lauryl sulfate, esters, and ketones allow the ink to penetrate the surface of the paper. Alcohols may also be used to increase the rate of drying of the liquid ink, and surfactants like detergents and soap reduce the surface tension to allow the ink to spread on the substrate.

The colorant can be selected from any of the suitable colorants listed in the Color Index, which is published jointly by American Association of Textile Chemist and Colorists (AATCC) and The Society of Dyers and Colorists in Bradford, England; BUYER'S GUIDE for Textile Chemist and Colorist published by AATCC, and those known in the art. Examples of other suitable colored pigments are described in the Colour Index, 3rd edition (The Society of Dyers and Colourists, 1982). The colorant may be present in the inks either with or without a dispersing agent. The pigment dispersing agent can be selected from a group consisting of anionic, cationic, and nonionic types.

Representative examples of black pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800 Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P). Other suitable carbon blacks include, but are not limited to, Printex 40, Printex 80, Printex 300, Printex L, Printex U, Printex V, Special Black 4, Special Black 5, FW200, (the foregoing available from Degussa Corporation), Raven 780, Raven 890, Raven 1020, Raven 1040, Raven 1255, Raven 1500, Raven 5000, Raven 5250 (the foregoing available from Columbian Chemical Corporation) and MA100 and MA440 available from Mitsubishi Chemical Corporation. The colored pigment will typically have a wide range of BET surface areas, as measured by nitrogen adsorption. Preferably, the colored pigment has a surface area equal or greater than 85 $m^2/g$, and more preferably equal or greater than and 100 $m^2/g$, thereby corresponding to a smaller primary/aggregate particle size. Such surface areas have been found to provide for a more uniform distribution and efficient level of treating agent on the surface of the pigment and a higher percent yield of the surface-modified colored pigment after post processing techniques. If the preferred higher surface area of the colored pigment (thereby corresponding to a smaller particle size) is not readily available, it is well recognized by those skilled in the art that the colored pigment may be subject to conventional size comminution or reduction techniques, such as ball or jet milling, to reduce the pigment to the desired particle size.

The pigment may be chosen from a wide range of conventional colored pigments. The colored pigment can be blue, black, brown, cyan, green, white, violet, magenta, red, yellow, as well as mixtures thereof. Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyanthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138. Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982). The color pigment can have a wide range of BET surface areas, as measured by nitrogen adsorption.

Other examples include Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine®Black TS (Pigment Black 7), available from Hoechst Celanese Corporation, Normandy Magenta RD-2400 (Paul Uhlich), Paliogen Violet 5100 (BASF), Paliogen® Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen® Blue L6900, L7020 (BASF), Heliogen® Blue D6840, D7080 (BASF), Sudan Blue OS (BASF), PV Fast Blue B2GO1 (American Hoechst), Irgalite Blue BCA (Ciba-Geigy), Paliogen® Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen® Orange 3040 (BASF), Ortho Orange OR 2673 (Paul Uhlich), Paliogen® Yellow 152, 1560 (BASF), Lithol Fast Yellow 0991K (BASF), Paliotol Yellow 1840 (BASF), Novoperm® Yellow FG 1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm® Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen® Red 3871K (BASF), Paliogen® Red 3340 (BASF), and Lithol Fast Scarlet L4300 (BASF).

In embodiments of the present invention where dyes are used, the dye is present in the ink composition in any effective amount to provide the desired color and/or optical density, and the like. Typically the dye is present in an amount from about 0.1 to about 15% by weight of total ink weight, and preferably from about 1.0 to about 10% by weight of total ink weight, although the amount can be outside this range. A mixture of dyes in any desired proportion may also be employed to obtain a specific shade or hue. Similarly, in embodiments of the present invention where pigments are used, the pigment may be present in the ink composition in any effective amount. Typically the pigment is present in an amount of from about 0.1 to about 15% by weight of total ink weight and preferably from about 1 to about 10% by weight of total ink weight, although the amount can be outside of this range. Where both dyes and pigments are incorporated into the ink composition, the weight percentage of the combined colorant may be adjusted accordingly.

The ink composition may contain a dye colorant. Any suitable dye or mixture of dyes compatible with the ink liquid vehicle can be used, with water soluble anionic dyes, direct dyes, reactive dyes, and cationic dyes being preferred. Examples of suitable dyes include, but are not limited to, Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza [18] annulenes, Formazan copper complexes, triphenodioxazines, Bemacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bemacid Red, available from Bemcolors, Poughkeepsie, N.Y.; Pontamine Brilliant Bond Blue; Bemcolor A. Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Hoechst, such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof.

Preferably, the pigment particle size is as small as possible to enable a stable colloidal suspension of the particles in the liquid vehicle with good color strength and to prevent clogging of the ink channels or nozzle openings when the ink is used in an ink jet printer. Preferred average particle sizes or diameters are generally varying from about 0.001 to about 3 microns, although the particle sizes can be outside these ranges in embodiments. A more preferred pigment particle size in the inks of the present invention includes particles having at least 50% of the particles being below 0.3 micron with no particles being greater than 3.0 micron (measured on a Hodaka CAPA 700 Particle Size Analyzer). More preferably, the average pigment particle size includes particles having at least 70% of the particles being below 0.3 micron with no particles being greater than 1.2 micron. However, pigment particle sizes can be outside of these ranges provided that they do not cause undesired precipitation and clogging.

In embodiments of the present invention, the pigment may be dispersed in the ink with one or more dispersants. The dispersants can be anionic, cationic, and nonionic types. Some preferred dispersants have both hydrophilic (comprising ionic groups which are capable of ionizing in water) and hydrophobic (affinity for pigments) moieties. Suitable dispersants include, but are not limited to, anionic dispersants, such as polymers and copolymers of styrene sulfonate salts (such as $Na^+$, $Li^+$, $K^+$, $Cs^+$, $Rb^+$, substituted and unsubstituted ammonium cations, and the like), unsubstituted and substituted (e.g., alkyl, alkoxy, substituted naphthalene derivatives, and the like) naphthalene sulfonate salts (such as $Na^+$, $Li^+$, $K^+$, $Cs^+$, $Rb^+$, substituted and unsubstituted ammonium cations, and the like) and an aldehyde derivative (such as unsubstituted alkyl aldehyde derivatives including formaldehyde, acetaldehyde, propylaldehyde, and the like), and the like, as well as mixtures thereof. Examples of such pigment dispersants include, but are not limited to, commercial products such as Versa® 4, Versa® 7, Versa® 77 (National Starch and Chemical Co.); Lomar® D (Diamond Shamrock Chemicals Co.); Daxad® 19, Daxad® K (W.R. Grace Co.); Tamol® SN (Rohm & Haas); and the like. Other useful pigment dispersants (anionic) include polymer or copolymers of styrene and an acrylic acid salt, styrene and a methacrylic acid salt, styrene and a maleic acid salt, and the like, as well as mixtures thereof.

Also, nonionic dispersants or surfactants can be used in inks of the present invention, such as ethoxylated monoalkyl or dialkyl phenols including Igepal® CA and CO series materials (Rhone-Poulenc Co., e.g., Igepal® CA-630, CO-630, etc.); and Triton® series materials (Union Carbide Company). These nonionic surfactants or dispersants can be used alone or in combination with the aforementioned anionic or cationic dispersants.

The ratio of pigment to aforementioned pigment dispersant(s) according to the present invention ranges from about 1/0.01 to about 1/3, preferably from about 1/0.1 to about 1/1, and most preferably from about 1/0.10 to about 1/0.75. The ratio of naphthalene substituent to aldehyde (e.g., formaldehyde, acetaldehyde, etc.) in the aforementioned anionic dispersant is approximately about 1:1, although this ratio can be different depending on the stoichiometry of the feed stock and reaction condition, and can readily be adjusted to obtain a dispersant having a desired molecular weight and the desired ratio of naphthalene substituent to aldehyde. The remainder of the dispersant may comprise nonactive ingredients such as water, solvent, or humectant. The weight-average molecular weight of the dispersant is generally less than 20,000, preferably less than 13,000, and more preferably less than 10,000. The pigment dispersion should contain enough dispersant to stabilize the pigment particles in water, but not so much as to adversely affect properties of the pigment dispersion and ink such as viscosity, stability, and optical density. Stable pigment dispersions comprising the desired dispersing agent or dispersant can be used in the inks of the present invention.

The pigment can be a pigment having attached at least one organic group. The organic group preferably contains a) at least one aromatic group, at least one $C_1$–$C_{20}$ alkyl group, or mixtures thereof; and preferably further contains b) at least one ionic group, ionizable group, nonionic group, or mixtures thereof.

The pigment can also be a pigment having one or more functional and/or stabilizer groups attached or present on the pigment by other means. Examples of such pigments include those set forth in JP 11166131; JP 11092686; JP 10265704; WO 98/32801; JP 10265710; WO 98/30638; EP 834537 and U.S. Pat. No. 5,609,671, all incorporated in their entirety by reference herein.

At least one aromatic group includes, but is not limited to, unsaturated cyclic hydrocarbons containing one or more rings and may be substituted or unsubstituted, for example with alkyl groups. Aromatic groups include aryl groups (for example, phenyl, naphthyl, anthracenyl, and the like) and heteroaryl groups (for example, imidazolyl, pyrazolyl, pyridinyl, thienyl, thiazolyl, furyl, triazinyl, indolyl, and the like). At least one $C_1$–$C_{20}$ alkyl group may be branched or unbranched, substituted or unsubstituted.

A preferred set of organic groups which may be used are organic groups substituted with an ionic group, an ionizable group or an nonionic group as a functional group. An ionizable group is one capable of forming an ionic group in the medium of use. The ionic group may be an anionic group or a cationic group and the ionizable group may form an anion or cation. The nonionic group is a group which does not possess or is not capable of possessing a charge.

Ionizable functional groups forming anions or anionic groups include, for example, acidic groups or salts of acidic groups. The organic groups, therefore, include groups derived from organic acids. When an organic group contains an ionizable group forming an anion, such an organic group can have a) an aromatic group or a $C_1$–$C_{20}$ alkyl group and b) at least one acidic group having a $pK_a$ of less than 11, or at least one salt of an acidic group having a $pK_a$ of less than 11, or a mixture of at least one acidic group having a $pK_a$ of less than 11 and at least one salt of an acidic group having a $pK_a$ of less than 11. The $pK_a$ of the acidic group refers to the $pK_a$ of the organic group as a whole, not just the acidic substituent. The $pK_a$ can be less than 10 or less than 9. The aromatic group of the organic group can be directly attached to the pigment. The aromatic group may be further substituted or unsubstituted, for example, with alkyl groups. The organic group may be a phenyl or a naphthyl group and the acidic group is a sulfonic acid group, a sulfinic acid group, a phosphonic acid group, or a carboxylic acid group. The organic group may be a substituted or unsubstituted sulfophenyl group or a salt thereof; a substituted or unsubstituted carboxyphenyl; a substituted or unsubstituted (polysulfo)phenyl group or a salt thereof; a substituted or unsubstituted sulfonaphthyl group or a salt thereof; or a substituted or unsubstituted (polysulfo)naphthyl group or a salt thereof.

Examples of organic groups that are anionic in nature include, but are not limited to, $-C_6H_4-COO^-\ X^+$; $-C_6H_4-SO_3^-X^+$; $-C_6H_4-(PO_3)^{-2}2X^+$; $-C_6H_2-(COO^-X^+)_3$; $-C_6H_3-(COO^-X^+)_2$; $-(CH_2)_z-(COO^-X^+)$; $-C_6H_4-(CH_2)_z-(COO^-X^+)$, wherein $X^+$ is any cation such as $Na^+$, $H^+$, $K^+$, $NH_4^+$, $Li^+$, $Ca^{2+}$, $Mg^{2+}$ and the like and z is an integer from 1 to 18. As recognized by those skilled in the art, $X^+$ may be formed in-situ as part of the manufacturing process or may be associated with the aromatic or alkyl group through a typical salt swap or ion-exchange process.

Amines represent examples of ionizable functional groups that form cations or cationic groups and may be attached to the same groups as discussed above for the ionizable groups which form anions. For example, amines may be protonated to form ammonium groups in acidic media. An organic group having an amine substituent can have a $pK_b$ of less than 5. Quaternary ammonium groups ($-NR_3^+$), quaternary phosphonium groups ($-PR_3^+$) and sulfonium groups ($-SR_2^+$) also represent examples of cationic groups. The organic group may contain an aromatic group such as a phenyl or a naphthyl group and a quaternary ammonium or a quaternary phosphonium or sulfonium group. Quaternized cyclic amines, and even quaternized aromatic amines, can also be used as the organic group. Thus, N-substituted pyridinium compounds, such as N-methyl-pyridyl, can be used in this regard.

Examples of organic groups that are cationic in nature include, but are not limited to, $-C_6H_4N(CH_3)_3^+Y^-$, $-C_6H_4COCH_2N(CH_3)_3^+Y^-$, $-C_6H_4(NC_5H_5)^+Y^-$, $-(C_5H_4N)C_2H_5^+Y^-$,$-(C_3H_5N_2)^+Y^-$(imidizoles), $-(C_7H_7N_2)^+Y^-$ (indizoles), $-C_6H_4COCH_2(NC_5H_5)^+Y^-$, $-(C_5H_4N)CH_3^+Y^-$, $-C_6H_4CH_2N(CH_3)_3^+Y^-$, wherein $Y^-$ is any halide or an anion such as $NO_3^-$, $OH^-$, $CH_3COO^-$ and the like; or combinations thereof. As recognized by those skilled in the art, $Y^-$ may be formed in-situ as part of the manufacturing process or may be associated with the aromatic or alkyl group through a typical salt swap or ion-exchange process.

Further examples of representative organic groups are also described in U.S. Pat. Nos. 5,571,311; 5,630,868; 5,707,432, 5,955,232; 5,922,118; 5,900,029; 5,895,522; 5,885,335; 5,851,280; 5,837,045; 5,713,988; and 5,803,959; PCT Publication No. WO 96/18688; and PCT Publication No. WO 96/18690, all hereby incorporated in their entirety by reference herein.

Further examples of the ionic or ionizable functional groups include amphiphilic counterions which may be cationic or anionic in nature. An amphiphilic counterion is a molecule or compound typically described as have a hydrophilic polar "head" and a hydrophobic "tail." Representative examples of cationic and anionic amphiphilic counterions include those set forth and described in U.S. Pat. No. 5,698,016 to Adams et al., the entire description of which is incorporated herein by reference.

For purposes of further illustrating the present invention, an amphiphilic counterion can be used. The modified pigment can have a cationic functionality (i.e. positive charge) or anionic functionality (negative charge). The charge preferably is created by the aromatic group or $C_1-C_{20}$ alkyl group of the diazotizable group attached to the pigment. If the desired modified pigment is anionic in nature, then the amphiphilic counterion will be cationic or positive charging. Similarly, if the modified pigment is cationic in nature, then the amphiphilic counterion will be anionic or negative charging.

Examples of cationic amphiphilic counterions include, but are not limited to, those described ammonium ions that may be formed from adding acids to the following: a fatty amine, an ester of an aminoalcohol, an alkylamine, a polymer containing an amine functionality, a polyethoxylated amine, a polypropoxylated amine, a polyethoxylated polypropoxylated amine, an aniline and derivatives thereof, a fatty alcohol ester of amino acid, a polyamine N-alkylated with a dialkyl succinate ester, a heterocyclic amine, a guanidine derived from a fatty amine, a guanidine derived from an alkylamine, a guanidine derived from an arylamine, an amidine derived from a fatty amine, an amidine derived from a fatty acid, an amidine derived from an alkylamine, or an amidine derived from an arylamine. The pKa of the ammonium ion is preferably greater than the pKa of the protonated form of the aromatic or alkyl group on the pigment.

Specific examples of cationic amphiphilic ions include dioctylammonium, oleylammonium, stearylammonium, dodecylammonium, dimethyldodecylammonium, stearylguanidinium, oleylguanidinium, soyalkylammonium, cocoalkylammonium, oleylammoniumethoxylate, protonated diethanolaminedimyristate, and N-oleyldimethylammonium. Generally, to form the ammonium ions described above, the various compounds described above such as fatty amines, esters of amino alcohols, etc., are reacted with an acid such as carboxylic acid, a mineral acid, an alkyl sulfonic acid, or an aryl sulfonic acid.

Quaternary ammonium salts can also be used as the sources of the cationic amphiphilic ion. Examples include, but are not limited to, a fatty alkyl trimethyl ammonium, a di(fatty alkyl)dimethylammonium, an alkyl trimethyl ammonium, or I -alkyl pyridinium salt, where the counterion is a halide, methosulfate, sulfonate, a sulfate or the like. Also, phosphonium salts, such as tetraphenylphosphonium chloride can be used as the sources of the amphiphilic ion.

Cationic amphiphilic ions for use in the present invention can include those represented by the formula $R_4N^+$, wherein R is independently hydrogen, $C_1-C_{30}$ alkyl, $C_1-C_{30}$ alkenyl, $C_7-C_{30}$ aralkyl, and $C_7-C_{30}$ alkaryl.

Another example of a suitable amphiphilic ion is a polymer containing an ammonium ion derived from an amine containing polymer. The amine containing polymer can be a copolymer of an amine containing monomer, such as dimethylaminoethyl methacrylate or -acrylate, or vinylpyridine or vinylimidazole, and another monomer such as methyl acrylate, methyl methacrylate, butyl acrylate, styrene, and the like. The polymer may also be a ter- or tetra-polymer containing a mixture of an amine containing monomer and two or three other amine containing monomers, respectively. Such a polymer may be prepared by any means, such as radical (emulsion, suspension, or solution) or anionic polymerization.

As stated earlier, the amphiphilic counterion can alternatively be an anionic amphiphilic counterion. Examples of such anionic amphiphilic ions include, but are not limited to, an alkylbenzene sulfonate, an alkyl sulfonate, an alkylsulfate, a sulfosuccinate, a sarcosine, an alcohol ethoxylate sulfate, an alcohol ethoxylate sulfonate, an alkyl phosphate, an alkylethoxylated phosphate, an ethoxylated alkylphenol sulfate, a fatty carboxylate, a taurate, an isethionate, an aliphatic carboxylate, or an ion derived from a polymer containing an acid group. Sources of specific and preferred examples of anionic amphiphilic ions include, but are not limited to, sodium dodecylbenzene sulfonate, a sodium dodecylsulfate, Aerosol OT, an oleic acid salt, a ricinoleic acid salt, a myrisitic acid salt, a caproic acid salt, sodium 2-octyldodecanoate, sodium bis(2-ethylhexyl) sulfosuccinate, a sulfonated polystyrene, or homo- or copolymers of acrylic acid or methacrylic acid or salts thereof.

Generally, the above-identified amphiphilic counterions and related compounds are commercially available in salt form or can be routinely made by one of ordinary skill in the art.

Nonionic groups may include, but are not limited to, hydrophilic groups, hydrophobic groups, alkyl and aryl groups, ethers, polyethers, alkyls, fluorinated alkyls and the like. These amphiphilic type groups can be made and attached onto the colored pigment following the procedures described in U.S. Pat. No. 5,698,016 incorporated in its entirety by reference herein. The pigments used in the present invention can have steric and amphiphilic groups as well as described in U.S. Provisional Application No. 60/157,284, incorporated in its entirety by reference herein.

Other examples of organic groups that can be attached onto the pigment include the following formulas. In each of the following formulas, -X is attached directly to the pigment and -X' can be directly attached to the pigment.

An example of a modified pigment product is a pigment having attached at least one group comprising the formula:

-X-Sp-[NIon]$_p$R wherein X represents an aromatic group or an alkyl group, NIon represents at least one non-ionic group, Sp represents a spacer group, R represents hydrogen, an aromatic group, or an alkyl group, and p is an integer of from 1 to 500.

The aromatic group with respect to the X substituent and/or the R substituent can be substituted or unsubstituted and can be, for instance, an aryl or heteroaryl group. The aromatic group can be substituted with any group, such as one or more alkyl groups or aryl groups. Preferably, the aromatic group is a phenyl, naphthyl, anthracenyl, phenanthrenyl, biphenyl, pyridinyl, benzothiadiazolyl, or benzothiazolyl. Examples of the alkyl group with respect to the X substituent and/or the R substituent include, but are not limited to, substituted or unsubstituted alkyl groups which may be branched or unbranched. The alkyl group can be substituted with one or more groups, such as aromatic groups. Examples of the alkyl group for purposes of the X substituent include, but are not limited to, $C_1-C_{12}$, like methyl, ethyl, propyl, butyl, pentyl, or hexyl groups. In other words, X and/or R can represent a branched or unbranched, substituted or unsubstituted, saturated or unsaturated hydrocarbon. Examples of substituted groups include, but are not limited to, an ester group, an amide group, an ether group, a carboxyl group, an aryl group, an alkyl group, and the like.

Sp or the spacer group as used herein is a link between two groups and can be a bond, or a chemical group such as, but not limited to, $CO_2$, $O_2C$, $SO_2$, CO, $SO_3, OSO_2, SO_3NR''$, $R''NSO_2$, NHCO, CONR'', NR''$CO_2$, $O_2CNR''$, NR''CONR'',S, NR'', $SO_2C_2H_4$, arylene, alkylene, NR''CO, $NHCO_2$, $O_2CNH$, NCHONH, and the like, wherein R'', which can be the same or different, represents an organic group such as a substituted or unsubstituted aryl and/or alkyl group.

Examples of the non-ionic group include, but are not limited to, groups having no apparent ionic charge, such as polymers of ethylene oxide, propylene oxide, other alkylene oxides, carboxylic acid esters, glycols, alcohols, esters, alkanolamine-fatty acid condensates, silicones, isocyanates, alkylpyrrolidenes, and alkylpolyglycosides. In non-aqueous media, the non-ionic group, in addition to the aforementioned groups, may have carboxylates, sulfonates, phosphates, amines, and other groups that typically demonstrate an ionic nature in water. The non-ionic group can be a $C_1-C_{12}$ alkyl group, or a $C_1-C_{12}$ alkylene oxide group. p can be 1–25, 26–50, 51–75, 75–100, and/or 101–500, and p preferably is 5 to 50.

The X substituent and/or non-ionic group may be substituted with one or more functional groups. The functional group preferably contains a lypophilic group. Examples of functional groups include, but are not limited to, R', OR', COR', COOR', OCOR', carboxylates, halogens, CN, NR'$_2$, $SO_3H$, sulfonates, $-OSO_3$, NR'(COR'), CONR'$_2$, $NO_2$, $PO_3H_2$, phosphonates, phosphates, N=NR', $NSO_2R'$, wherein R' which can be the same or different, is independently hydrogen, branched or unbranched $C_1-C_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkylaryl, or substituted or unsubstituted arylalkyl.

Amines also represent examples of functional groups as well as quaternary ammonium groups ($-NR_3^+$) and quaternary phosphonium groups ($-PR_3^+$), as well as quaternary sulfonium groups ($-SR_2^+$).

In an additional embodiment of the present invention, the pigment can be a pigment having attached at least one group comprising the formula:

-X-Sp-[A]$_p$R wherein X represents an aromatic group or an alkyl group; Sp represents a spacer group; A represents an alkylene oxide group of from about 1 to about 12 carbons; p represents an integer of from 1 to 500, and R represents hydrogen, a substituted or unsubstituted alkyl group, or a substituted or unsubstituted aromatic group. A can be the same of different when p is greater than 1. X can be substituted or unsubstituted and can include substituted groups such as an ester group, an amide group, an ether group, a carbonyl group, an aryl group, an alkyl group and the like. The substituted groups can be attached or linked to A.

Examples of alkylene groups include, but are not limited to, $-CH_2-CH_2-O-$; $-CH(CH_3)-CH_2-O-$; $-CH_2CH_2CH_2-O-$; or combinations thereof.

In another embodiment of the present invention, the pigment can be a pigment having attached at least one group comprising the formula:

-X-Sp-[($-CH_2-)_m-O-)_p-R$]

wherein X is described above, and for instance can represent an aromatic group or an alkyl group as described earlier, m is an integer of from 1 to 12, preferably 2 or 3, p is an integer of from 1 to 500, Sp represents a spacer group, and R is described above, and for instance can be hydrogen, a substituted or unsubstituted alkyl group, or a substituted or unsubstituted aromatic group. Examples of R substituents include, but are not limited to, hydrogen, methyl, ethyl, butyl, or propyl groups. p can be 1–25, 26–50, 51–75, 76–100, and 101–500, and is preferably 5to 50. Further examples of groups of this formula are where X is a benzene group, m is 1 to 5, and more preferably 2 or 3, p is 5 to 50, more preferably 44–45, and R is hydrogen or a methyl group. Another example is where m is 2, p is 7, R is a methyl group, and X is a benzene group.

In yet another embodiment of the present invention, the pigment can be a pigment having attached at least one polymeric group, wherein the polymeric group comprises the formula:

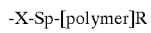

-X-Sp-[polymer]R wherein X and Sp are described above, and for instance can represent at least an aromatic group or at least an alkyl group as described earlier, "polymer" comprises repeating monomer groups or multiple monomer groups or both, optionally having at least one -X' group. The 'polymer' can be substituted or unsubstituted with additional groups, and R is described above, and for instance can represent hydrogen, a bond, a substituted or unsubstituted alkyl group, or a substituted or unsubstituted aromatic group. When X represents an alkyl group, the "polymer" preferably has no ionic or ionizable group. X' represents an aromatic group or alkyl group, and each X' and X can be the same or different. The total monomer repeating units that comprise the "polymer" is not greater than about 500 monomer repeating units. X and/or X' can be substituted or unsubstituted and can include substituted groups such as an ester group, an amide group, an ether group, and the like. The substituted groups can be linked to the "polymer." Also, when R represents a bond, the available bond can be attached to the pigment. When X represents an alkyl group in this formula, the polymeric group can have no ionic or ionizable group. The polymeric group can be any polymeric group capable of being attached to a pigment For purposes of the present invention and this formula immediately above, one or more polymeric groups that comprise the "polymer" can be present. The polymeric group can be a thermoplastic polymeric group or a thermosetting polymeric group. Further, the polymeric group can be a homopolymer, copolymer, terpolymer, and/or a polymer containing any number of different repeating units. Further, the polymeric group present in the present invention can be any type of polymeric group, such as a random polymer, alternating polymer, graft polymer, block polymer, star-like polymer, and/or comb-like polymer. The polymeric group used in the present invention can also be one or more polyblends. The polymeric group can be an interpenetrating polymer network (IPN); simultaneous interpenetrating polymer network (SIN); or interpenetrating elastomeric network (IEN).

Specific examples of polymeric groups include, but are not limited to, linear-high polymers such as polyethylene, poly(vinylchloride), polyisobutylene, polystyrene, polycaprolactam (nylon), polyisoprene, and the like. Other general classes of polymeric groups of the present invention are polyamides, polycarbonates, polyelectrolytes, polyesters, polyethers, (polyhydroxy)benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), fluoropolymers, ionomeric polymers, polymers containing ketone group(s), liquid crystal polymers, polyamide-imides, polymers containing olefinic double bond(s) (such as polybutadiene, polydicyclopentadiene), polyolefin copolymers, polyphenylene oxides, poly(vinyl alcohols), polyurethanes, thermoplastic elastomers, and the like.

Generally, the polymeric groups described in Volume 18 of the Encyclopedia of Chemical Technology, KIRK-OTHMER, (1982), page 328 to page 887, and Modern Plastics Encyclopedia '98, pages B-3 to B-210, and "Polymers: Structure and Properties," by C. A. Daniels, Technomic Publishing Co., Lancaster, Pa. (1989), all incorporated in their entirety herein by reference, can be used as the polymeric groups of the present invention.

The polymeric groups of the present invention can be prepared in a number of ways and such ways are known to those skilled in the art. The above referenced KIRK-OTHMER section, Modern Plastics Encyclopedia, and C. A. Daniels' reference provide methods in which these polymeric groups can be prepared.

The polymeric group can be a polyolefin group, a polyurethane group, a polystyrenic group, a polyacrylate group, a polyamide group, a polyester group, or mixtures thereof. Examples of R groups can be the same as previously described above. p can be 1–25, 26–50, 51–75, 76–100, 101–500, and is preferably 1 to 100, and more preferably 5 to 50.

Also, the organic group(s) attached to the pigment can be one or more types of dyes, such as, but not limited to, Nile Blue A, Toluidine Blue, Tryan Blue, C.I. Acid Blue 40, C.I. Acid Blue 129, C.I. Acid Blue 9, C.I. Acid Blue 185, C.I. Direct Blue 71, C.I. Direct Blue 199, C.I. Direct Red 9, C.I. Acid Red 18, C.I. Acid Red 27, C.I. Direct Yellow 86, C.I. Direct Yellow 4, C.I. Acid Yellow 23, and C.I. Food Black 2. Besides the organic group comprising the dye, an organic group having an ionic group and a counterionic group can have a dye serving as the counterionic group. Attaching a dye to the pigment can provide the advantage of modifying the color properties of pigments. Also, the organic group(s) attached to the pigment can be one or more types of light stabilizers, e.g., hindered amine light stabilizer (HALS) or antioxidant.

The level of treatment of the various groups attached on the pigment can be any amount and preferably is from about 0.10 to about 50 micromoles/m$^2$, and more preferably is from about 0.30 to about 10 micromoles/m$^2$. When low levels of treating agent are desired, it has been found that the diazotizable/organic group is typically introduced (i.e. present in the reaction solution) at a level from about 0.01 to 5.0 micromoles/m$^2$ of the pigment used, based upon the nitrogen surface area of the pigment. When traditional levels of treating agent are desired, it has been found that the diazotizable/organic group is typically introduced (i.e. present in the reaction solution) at a level from about 5.0 to 50.0 micromoles/m$^2$ of the colored pigment used, based upon the nitrogen surface area of the colored. Lastly, it will be appreciated by those skilled in the art that the pH of the reaction mixture may be varied depending on the particular treating agent and the most efficient reaction conditions and may, for example, be at a pH around neutral if appropriate.

The pigment products may be purified by washing, such as by filtration, centrifugation, or a combination of the two methods, to remove unreacted raw materials, byproduct salts, and other reaction impurities. The products may also be isolated, for example, by evaporation or it may be recovered by filtration and drying using known techniques to those skilled in the art. Dispersions of the pigments of the present invention may be further purified or classified to remove impurities and other undesirable free species which can co-exist in the dispersion as a result of the manufacturing process. The pigment dispersions can be subjected to a classification step, such as centrifugation, to substantially remove particles having a size above about 1.0 micron, preferably above about 0.5 micron. In addition, the dispersion is preferably purified to remove any undesired free species, such as unreacted treating agent. Known techniques of ultrafiltration/diafiltration using a membrane or ion exchange may be used to purify the dispersion and remove a substantial amount of free ionic and unwanted species. Also preferred is an optional exchange of counterions whereby the counterions that form a part of the surface-modified pigment are exchanged or substituted with alternative counterions utilizing known ion exchange techniques such as ultrafiltration, reverse osmosis, ion exchange columns and the like. Particular examples of counterions that can be exchanged include, but are not limited to, $Na^+$, $K^+$, $Li^+$, $NH_4^+$, $Ca^{2+}$, $Mg^{2+}$, $Cl^-$, $NO_3^{31}$, $NO_2^-$, acetate, carboxylate, and $Br^-$. Such additional classification purification methods are more fully described in U.S. patent application Ser. No. 09/240,291, filed Jan. 29, 1999, the disclosure of which is fully incorporated herein by reference. The colored pigments of the present invention may be used in aqueous or solvent based compositions containing conventional pigments.

The colorant present in the ink can be any conventional amount. Typically, the colorant will be present in an amount ranging from about 1% to about 20%, preferably from about 2% to about 10%, based on the weight of the ink composition. More preferably, the amount of colorant present is from about 3% to about 7%, based on the weight of the ink. The colorant can be present in the aqueous or solvent based ink or inkjet composition in an amount effective to provide the desired image quality, e.g., optical density, without detrimentally affecting the performance of the ink. In addition, the pigment, when used, is typically as small as possible to enable a stable colloidal suspension of the pigment in the liquid vehicle and to prevent clogging of the ink channels and nozzles when used in the desired printing application. For example, a preferred average particle size of the pigment for use in a thermal inkjet printer are generally below 1.0 micron, preferably in a range from about 0.005 micron to about 0.3 micron.

The pigment, either as predispersion or as a solid, can be incorporated into an ink formulation using standard techniques. Use of a water dispersible or solvent-dispersible modified pigment can provide a significant advantage and cost savings by reducing or eliminating the milling steps generally used with other conventional pigments.

Additionally, the inks may incorporate some dye to modify color balance and adjust optical density. Such dyes include food dyes, FD & C dyes, derivatives of phathalocyanine tetrasulfonic acids, including copper phthalocyanine deviates, tetra sodium salts, tetra ammonium salts, tetra potassium salts, tetra lithium salts, and the like.

Polymers or oligomers may be added to inks based on the modified pigment products. The images created from such an ink may be water-insoluble upon polymerization or cross-linking of the added polymers or oligomers.

Ink compositions of the present invention have been found suitable for use in imaging applications, particularly for use in inkjet inks. Such ink and inkjet compositions exhibit improved formulation properties and storage stability. In addition, images generated from such ink and inkjet compositions exhibit good waterfastness and color intensity.

The ink compositions of the present invention may be prepared utilizing conventional techniques known to those skilled in the art, such as combining or mixing the desired component in a suitable aqueous or solvent based medium. When the ink and inkjet ink compositions are aqueous based systems, a significant amount of water, preferably deionized or distilled water, is typically used. For example, the amount of water or similar medium is generally present in an amount ranging from about 50% to about 95%, preferably from about 60% to 80%, based on the weight of the ink or inkjet ink composition.

The ink and inkjet compositions of the present invention may be buffered to the desired pH by the addition of a suitable base, such as sodium hydroxide, ammonium hydroxide, triethylamine, dimethylethanolamine and the like, or a suitable acid, such as mineral acids, hydrochloric acid, sulfuric acid and the like. In addition, a polymer which is soluble in the ink composition may be added to improve the waterfastness of the images generated from the ink compositions. By "soluble" is meant that the polymer will dissolve in the ink vehicle to form a one phase system. These polymers include, for example, polyvinyl alcohol, polyester, polyestermelamine, styrene-acrylic acid copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl napthalene-acrylic acid copolymers, vinyl napthalene-maleic acid copolymers and salts thereof Additional polymers include polyvinylimidazole, derivatives of polyvinylimidazole, polyvinylpyrolidone and copolymers thereof, copolymers of vinylimidazole, copolymers of vinylimidazole derivatives, polyvinylpyridine, derivatives of polyvinylpyridine, copolymers of vinylpyridine, copolymers of vinylpyridine derivatives, polyethyleneimine, derivatives of polyethyleneimine, and mixtures thereof, as described in PCT Publication No. WO 96/18688, the disclosure of which is fully incorporated herein by reference.

Printed images may be generated from the ink or inkjet ink compositions of the present invention by incorporating such compositions into a suitable printing apparatus, and generating an image onto a substrate. Suitable inkjet printers include, for example, thermal printers, piezoelectric printers, continuous printers, valve printers and the like. Similarly, any suitable substrate can be employed including plain papers, bonded papers, coated papers, transparency materials, textile materials, plastics, polymeric films, inorganic substrates and the like.

In general, an ink consists of four basic components: (1) a colorant, (2) a vehicle which functions as a carrier during printing, (3) additives to improve printability, drying, and the like, and (4) solvents to adjust viscosity, drying and the compatibility of the other ink components. For a general discussion of the properties, preparation and uses of inks, see The Printing Manual, 5th Ed., Leach et al, Eds. (Chapman and Hall, 1993) incorporated herein by reference. Various ink compositions are also disclosed, for example, in U.S. Pat. Nos. 2,833,736; 3,607,813; 4,104,833; 4,770,706; and 5,026,755, incorporated in their entirety herein by reference.

Flexographic inks represent a group of ink compositions. Flexographic inks generally include a colorant, a binder, and a solvent. The ink of the present invention can be used in news inks. For example, a news ink composition may comprise an ink vehicle (e.g., water), colored pigments, a resin, and optional conventional additives such as antifoam additives or a surfactant.

The inks of the present invention can also be used in the manufacture of lithographic printing plates, such as infrared or near-infrared laser-imageable printing plates. Typically, imaging occurs when the plate is exposed to radiation having wavelengths of between 800 and 1100 nm. Generally, an infrared or near-infrared laser-imageable lithographic printing plate includes at least the following layers: a grained-metal or polyester plate or sheet-like substrate and a radiation-absorptive layer coated thereon. Protective layers for the substrate or the surface of the coated plate may also be used in the present invention. When coated onto the substrate, the protective layer can also serve as an adhesion-promoting primer. Other layers may be used, for example, to improve adhesion between layers and durability of the printing plate. The radiation-absorptive layer contains the colored pigment of the present invention along with other conventional ingredients, such as resins and binders. In the imaging process, a lithographic printing plate is selectively exposed to a laser output or other source capable of removing or chemically modifying the radiation-absorbent layer or layers adjacent thereto. The laser output will define a pattern on the printing plate and remove or modify only those portions of the radiation-absorptive layer which define the pattern. Afterwards, the printing plate can be further developed by subjecting it to a solvent capable of removing the imaged layer(s), if any remains, which defines the same pattern. The details of the various conventional components and techniques for such printing plates are described in U.S. Pat. No. 5,493,971; EP 0 803 771 A1; EP 0 770 494 A2; EP 0 770495 A1; as well as PCT Publication WO-98/31550 and the patents and publications referenced therein, all of which are incorporated in their entirety by reference herein.

The present invention will be further clarified by the following examples, which are intended to be purely exemplary of the present invention.

EXAMPLES

Inks were prepared using, by weight, 4% Colorant (Active), 17.5% 2-pyrrolidone (humectant), 2.5% 1,5-pentanediol (humectant), surfactant {Diethyleneglycol Monobutylether (DEGMBE) and/or Surfadone LP100 (LP100) and/or Surfadone LP300 (LP300)} and the balance de-ionized water. Colorant type and surfactant type and concentration are defined in the following tables.

Prints were generated using a Hewlett Packard Deskjet 690C printer, HP51629A cartridges, and Xerox 4024 DP paper.

Banding was rated on a scale of 1 to 4 (1 being a high level of banding and 4 being no banding) by visual assessment. Highlighter smear testing was performed by applying two passes of an Avery Dennison highlighter (07-74X) to the printed image. Highlighter Smear was rated on a scale of 1 to 4 (1 being a high level of the printed image was displaced by the highlighter and 4 being none of the printed image was displaced by the highlighter) by visual assessment. Waterfastness was defined as the time (in minutes) required for a printed image to no longer "run" when water was applied.

| Colorant | Manufacturer | Name | Base | Surface Chemistry | Counter Ion |
|---|---|---|---|---|---|
| A | Cabot | CAB-O-JET 300 | Carbon Black | Carboxylate | Sodium |
| B | Cabot | CAB-O-JET 200 | Carbon Black | Sulfonate | Sodium |
| C | Cabot | IJX 918 | Carbon Black | Carboxylate | Ammonium |
| D | Cabot | IJX 215C | Carbon Black | Quaternary Amine | Acetate |
| E | Orient Chemical | Bonjet CW 1 | Carbon Black | — | — |
| F | Hewlett Packard | HP51626A Ink | Dye | — | — |
| G | Hewlett Packard | HP51629A Ink | Pigment | — | — |

[1]Formulations were prepared using, by weight, 4% Colorant (Active), 17.5% Diethylene glycol, 2.5% 1,5-pentanediol, surfactant {Diethyleneglycol Monobutylether (DEGMBE) or Surfadone LP100 (LP100)} and the balance de-ionized water.
[2]Formulations were prepared using, by weight, 4% Colorant (Active), 17.5% Diethylene glycol, 2.5% 1,4-butanediol, surfactant {Diethyleneglycol Monobutylether (DEGMBE) or Surfadone LP100 (LP100)} and the balance de-ionized water.
[3]Only surfactant was added to these pre-formulated inks.

| | Banding | |
|---|---|---|
| Colorant | Surfactant | Banding |
| A | 1.5% DEGMBE | 3 |
| A | 1.0% LP100 | 4 |
| A | 1% LP100, 0.1% LP300 | 4 |
| A[1] | 15% DEGMBE | 2 |
| A[1] | 1.0% LP100 | 3 |
| A[2] | 1.5% DEGMBE | 1 |
| A[2] | 1.0% LP100 | 4 |
| B | 1.5% DEGMBE | 3 |
| B | 1.0% LP100 | 4 |
| C | 1.5% DEGMBE | 3 |
| C | 1.0% LP100 | 4 |
| D | 1.0% LP100 | 4 |
| E | 1.5% DEGMBE | 3 |
| E | 0.1% LP100 | 4 |
| E | 0.1% LP300 | 4 |
| F[3] | none | 3 |
| F[3] | 0.1% LP100 | 4 |
| F[3] | 0.1% LP300 | 4 |
| G[3] | none | 3 |
| G[3] | 1.0% LP100 | 4 |

The addition of Surfadone LP 100 and/or Surfadone LP300 in low concentrations reduced the degree of banding in the above inks.

| | Highlighter | |
|---|---|---|
| Colorant | Surfactant | Highlighter |
| A | 1.5% DEGMBE | 1 |
| A | 1.0% LP100 | 3 |
| A | 1.0% LP300 | 3 |
| A | 1% LP100, 0.1% LP300 | 4 |
| B | 1.5% DEGMBE | 1 |
| B | 1.0% LP100 | 4 |
| C | 1.5% DEGMBE | 1 |
| C | 1.0% LP100 | 4 |

-continued

Highlighter

| Colorant | Surfactant | Highlighter |
|---|---|---|
| D | 1 5% DEGMBE | 1 |
| D | 1.0% LP100 | 4 |
| E | 1.5% DEGMBE | 1 |
| E | 0.1% LP100 | 4 |
| E | 1.0% LP100 | 4 |
| G3 | none | 1 |
| G3 | 1.0% LP100 | 4 |

The addition of Surfadone LP 100 and/or Surfadone LP300 in low concentrations improved the highlighter smear properties of the above inks.

Waterfastness

| Colorant | Surfactant | Waterfastness (min) |
|---|---|---|
| C | 1.5% DEGMBE | >60 |
| C | 1.0% LP100 | 1 |
| D | 1.5% DEGMBE | >60 |
| D | 1.0% LP100 | 1 |
| E | 1.5% DEGMBE | >60 |
| E | 1.0% LP100 | 1 |

The addition of Surfadone LP100 or Surfadone LP300 in low concentrations reduced the time to achieve good waterfastness in the above inks.

Other embodiments of the present invention will be apparent to those skilled in the art from consideration of the specification and practice of the invention disclosed herein as well as equivalents thereof. It is intended that the specification and examples be considered as exemplary only, with a true scope and spirit of the present invention being indicated by the following claims and equivalents thereof.

What is claimed is:
1. An inkjet ink comprising:
   at least one colorant, wherein said colorant is a pigment having attached at least one organic group;
   at least one liquid vehicle;
   at least one humectant; and
   at least one cyclic amide, wherein said cyclic amide has the formula:

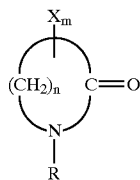

and optionally at least one dispersant, wherein n is an integer of from 3 to 7, m is an integer of from 0 to 3, or equals n; X represents an alkyl group, and R represents a $C_5$ or higher alkyl group.

2. The inkjet ink of claim 1, wherein said colorant is a carbon black.

3. The inkjet ink of claim 1, wherein said organic group comprises a) at least one aromatic group, at least one $C_1$–$C_{20}$ alkyl group, of mixtures thereof.

4. The inkjet ink of claim 3, wherein said organic group further comprises at least one ionic group, ionizable group, non-ionic group, or mixtures thereof.

5. The inkjet ink of claim 3, wherein said organic group further comprises at least one ionic group and at least one counterionic group.

6. The inkjet ink of claim 1, wherein said at least one cyclic amide is $C_5$ or higher alkyl pyrrolidone.

7. The inkjet ink of claim 6, wherein said at least one cyclic amide is an n-alkyl-2-pyrrolidone.

8. The inkjet ink of claim 1, wherein said X is optionally substituted with hydroxy or ether groups.

9. The inkjet ink of claim 1, wherein said R is a $C_5$–$C_{20}$ alkyl group.

10. The inkjet ink of claim 1, wherein said R group represents a $C_5$–$C_{12}$ alkyl group.

11. The inkjet ink of claim 1, wherein said R group represents a $C_8$–$C_{12}$ alkyl group.

12. The inkjet ink of claim 1, wherein said R group is non-cyclic.

13. An ink comprising:
   at least one colorant, wherein said colorant is a pigment having attached at least one organic group;
   at least one liquid vehicle;
   at least one humectant; and
   at least one cyclic amide, wherein said cyclic amide has the formula:

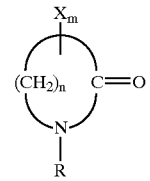

wherein n is an integer of from 3 to 7, m is an integer of from 0 to 3, or equals n, X represents an alkyl group, and R represents a $C_5$ or higher alkyl group.

14. The inkjet ink of claim 13, wherein said colorant is a carbon black.

15. The inkjet ink of claim 13, wherein said organic group comprises a) at least one aromatic group, at least one $C_1$–$C_{20}$ alkyl group, of mixtures thereof.

16. The ink of claim 15, wherein said organic group further comprises at least one ionic group, ionizable group, non-ionic group, or mixtures thereof.

17. The ink of claim 13, wherein said R group is non-cyclic.

18. A method to increase resistance to highlighter smear in a printed image comprising incorporating into an ink at least one colorant, wherein said colorant is a pigment having attached at least one organic group, and an effective amount of at least one cyclic amide having the formula:

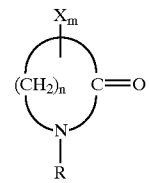

wherein n is an integer of from 3 to 7, m is an integer of from 0 to 3, or equals n; X represents an alkyl group, and R represents a $C_5$ or higher alkyl group.

19. A method to minimize banding of a printed image comprising incorporating into an ink at least one colorant, wherein said colorant is a pigment having attached at least one organic group, and an effective amount of at least one cyclic amide having the formula:

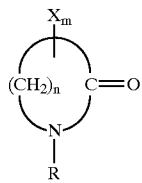

wherein n is an integer of from 3 to 7, m is an integer of from 0 to 3, or equals n; X represents an alkyl group, and R represents a $C_5$ or higher alkyl group.

20. A method to improve the waterfastness of a printed image comprising incorporating into an ink at least one colorant, wherein said colorant is a pigment having attached at least one organic group, and an effective amount of at least one cyclic amide having the formula:

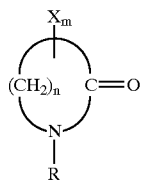

wherein n is an integer of from 3 to 7, m is an integer of from 0 to 3, or equals n; X represents an alkyl group, and R represents a $C_5$ or higher alkyl group.

21. A method to improve the dry or wet rub resistance of a printed image comprising incorporating into an ink at least one colorant, wherein said colorant is a pigment having attached at least one organic group, and an effective amount of at least one cyclic amide having the formula:

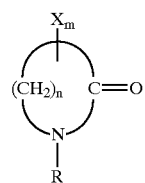

wherein n is an integer of from 3 to 7, m is an integer of from 0 to 3, or equals n; X represents an alkyl group, and R represents a $C_5$ or higher alkyl group.

* * * * *